US011840299B2

(12) United States Patent
Jauch et al.

(10) Patent No.: US 11,840,299 B2
(45) Date of Patent: Dec. 12, 2023

(54) TRANSMISSION FOR A MOTORCYCLE, AND MOTORCYCLE COMPRISING SUCH A TRANSMISSION

(71) Applicant: Bayerische Motoren Werke Aktiengesellschaft, Munich (DE)

(72) Inventors: Thilo Jauch, Munich (DE); Josef Miritsch, Gerolsbach (DE); Josef Seidl, Strasskirchen (DE); Roland Stocker, Salzweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 828 days.

(21) Appl. No.: 16/960,172

(22) PCT Filed: Jan. 29, 2019

(86) PCT No.: PCT/EP2019/052150
§ 371 (c)(1),
(2) Date: Jul. 6, 2020

(87) PCT Pub. No.: WO2019/158355
PCT Pub. Date: Aug. 22, 2019

(65) Prior Publication Data
US 2020/0354005 A1 Nov. 12, 2020

(30) Foreign Application Priority Data
Feb. 13, 2018 (DE) .................... 10 2018 202 218.6

(51) Int. Cl.
*B62H 5/08* (2006.01)
*B62M 7/04* (2006.01)
*F16H 63/34* (2006.01)

(52) U.S. Cl.
CPC ............ *B62H 5/08* (2013.01); *B60Y 2200/12* (2013.01); *B62M 7/04* (2013.01); *F16H 63/3458* (2013.01)

(58) Field of Classification Search
CPC .. F16H 63/3458; F16H 63/3475; F16H 63/34; B60Y 2200/12
See application file for complete search history.

(56) References Cited

U.S. PATENT DOCUMENTS

| 4,329,953 A | 5/1982 | Row |
| 8,122,786 B2 * | 2/2012 | Kirchner ............... F16D 63/006 74/577 M |

(Continued)

FOREIGN PATENT DOCUMENTS

| CN | 1699108 A | * 11/2005 |
| CN | 1699108 A | 11/2005 |

(Continued)

OTHER PUBLICATIONS

International Search Report (PCT/ISA/210) issued in PCT Application No. PCT/EP2019/052150 dated Apr. 30, 2019 with English translation (eight (8) pages).

(Continued)

*Primary Examiner* — Derek D Knight
(74) *Attorney, Agent, or Firm* — Crowell & Moring LLP

(57) ABSTRACT

A transmission for a motorcycle includes a housing; at least one shaft at least partially accommodated in the housing, a locking device which has at least one first locking element which can be rotated with the shaft and at least one second locking element which can be moved relative to the housing, relative to the shaft, and relative to the first locking element. The second locking element can move between at least one release position in which the locking elements do not engage in one another and the shaft is released for rotation, and at least one locking position in which the locking elements (Continued)

engage in one another to secure the shaft against rotation relative to the housing. The transmission further includes an actuating device configured to move the second locking element out of the release position into the locking position via at least one intermediate position.

12 Claims, 2 Drawing Sheets

(56) References Cited

U.S. PATENT DOCUMENTS

| | | | |
|---|---|---|---|
| 9,518,657 B2* | 12/2016 | Kristofcsak | F16H 63/3408 |
| 2002/0023468 A1 | 2/2002 | Frick et al. | |
| 2004/0237694 A1 | 12/2004 | Lindenschmidt et al. | |
| 2007/0256879 A1* | 11/2007 | Pieronczyk | B60R 25/02153 |
| | | | 180/287 |
| 2007/0283735 A1 | 12/2007 | Schweiher et al. | |
| 2008/0053170 A1 | 3/2008 | Kirchner | |
| 2012/0097497 A1 | 4/2012 | Austermann et al. | |

FOREIGN PATENT DOCUMENTS

| | | |
|---|---|---|
| CN | 101052554 A | 10/2007 |
| CN | 201037014 Y | 3/2008 |
| CN | 102248975 A | 11/2011 |
| CN | 107110352 A | 8/2017 |
| DE | 42 35 142 A1 | 11/1993 |
| DE | 10 2004 021 981 A1 | 11/2004 |
| DE | 10 2006 042 637 B4 | 9/2008 |
| DE | 10 2007 018 218 A1 | 10/2008 |
| DE | 10 2010 042 917 A1 | 4/2012 |
| DE | 10 2012 012 672 A1 | 1/2013 |
| EP | 1 182 104 A2 | 2/2002 |
| EP | 1 855 033 A2 | 11/2007 |
| EP | 1 982 878 A2 | 10/2008 |
| EP | 1 982 878 B1 | 7/2010 |
| JP | 2002-166742 A | 6/2002 |

OTHER PUBLICATIONS

German-language Written Opinion (PCT/ISA/237) issued in PCT Application No. PCT/EP2019/052150 dated Apr. 30, 2019 (10 pages).

German-language Search Report issued in German Application No. 10 2018 202 218.6 dated Feb. 13, 2019 with partial English translation (14 pages).

Chinese-language Office Action issued in Chinese Application No. 201980007777.1 dated Feb. 24, 2022 with English translation (17 pages).

Chinese-language Office Action issued in Chinese Application No. 201980007777.1 dated Mar. 22, 2021 with English translation (19 pages).

* cited by examiner

TRANSMISSION FOR A MOTORCYCLE, AND MOTORCYCLE COMPRISING SUCH A TRANSMISSION

BACKGROUND AND SUMMARY OF THE INVENTION

The invention relates to a transmission for a motorcycle. Furthermore, the invention relates to a motorcycle with a transmission of this type.

A transmission of this type for a motorcycle and a motorcycle of this type with a transmission of this type can already be gathered as known, for example, from CN 1699108 A. The motorcycle comprises at least one drive motor and the transmission which can be driven by the drive motor. Here, the transmission comprises a housing and at least one shaft which can be rotated relative to the housing about a rotational axis and is received at least partially in the housing. Moreover, the transmission comprises a locking device which has at least one first locking element which can rotate with the shaft and at least one second locking element. The second locking element can be moved along a movement direction relative to the housing, relative to the shaft and relative to the first locking element between at least one released position and at least one locked position. In the locked position, the locking elements engage into one another, as a result of which the locking elements interact in a positively locking manner. As a result, the shaft is secured by means of the locking elements against a rotation relative to the housing. In the released position, an engagement of the locking elements into one another does not take place, with the result that, in the released position, the locking elements release the shaft for a rotation relative to the housing about the rotational axis.

Furthermore, an actuating device is provided, by means of which, with actuation of the actuating device, the second locking element can be moved out of the released position into the locked position via at least one intermediate position which lies between the released position and the locked position.

Moreover, DE 42 35 142 A1 discloses a transmission lock for motorcycles; the transmission lock is intended to provide satisfactory protection of the motorbike against theft.

It is an object of the present invention to develop a transmission and a motorcycle of the type mentioned at the outset in such a way that a particularly advantageous actuation of the locking device can be realized.

A first aspect of the invention relates to a transmission for a motorcycle which, in the context of the invention, is a single track motor vehicle which is also called a motorbike. The transmission can be driven, for example, by a drive motor of the motorcycle, by the drive motor providing torques, for example, which are introduced into the transmission. The transmission comprises a housing (also called a transmission housing) and at least one shaft which can be rotated relative to the housing about a rotational axis and is received in the housing at least partially, in particular at least predominantly or completely. The shaft is, for example, a transmission output shaft which is coupled at least indirectly to precisely one or at least one wheel of the motorcycle. As a result, for example, the wheel can be driven via the shaft by the drive motor, as a result of which the motorcycle overall can be driven.

Furthermore, the transmission comprises a locking device which has at least one first locking element which can co-rotate with the shaft and at least one second locking element. The first locking element is formed, for example, by way of a gear which is configured separately from the shaft and is connected fixedly to the shaft so as to rotate with it, which gear can be, for example, a gearwheel of a gear of the transmission, which gearwheel is configured, in particular, as a movable gear, or else can be a locking gear which is provided, for example, in addition to gearwheels of the transmission.

The second locking element can be moved along a movement direction relative to the housing, relative to the shaft and relative to the first locking element, in particular in a translational manner, between at least one released position and at least one locked position. In the locked position, the locking elements engage into one another, as a result of which the locking elements interact in a positively locking manner. As a result, the shaft is secured by means of the locking elements against rotation relative to the housing about the rotational axis. To this end, for example, the second locking element is held on the housing in such a way that the second locking element is secured against rotation relative to the housing about the rotational axis.

In the released position, an engagement of the locking elements into one another does not take place. In other words, the locking elements do not engage into one another in the released position, as a result of which, in the released position, the locking elements release the shaft for a rotation relative to the housing about the rotational axis. Since, for example, the at least one wheel is coupled to the shaft, in particular permanently, the wheel is secured against a rotation relative to a frame of the motorcycle in the locked position, for example, as a result of which the motorcycle can be secured, for example, against rolling away unintentionally. Moreover, an actuating device is provided, by means of which, with actuation of the actuating device, the second locking element can be moved out of the released position into the locked position via at least one intermediate position which lies between the released position and the locked position.

In order for it then to be possible for a particularly advantageous actuation of the locking device to be realized, a safety device is provided according to the invention which, in the actuated state of the actuating device, that is to say despite the actuated state of the actuating device, permits a movement of the second locking element out of the intermediate position which results from the actuated state of the actuating device into the released position, and has at least one deflector face which is provided on at least one of the locking elements, runs obliquely with respect to the movement direction, and by means of which, in the actuated state of the actuating device or despite the actuated state of the actuating device, the second locking element can be moved out of the intermediate position into the released position as a consequence of a contact of the deflector face which is provided on the at least one locking element with the respective other locking element, which contact results from a rotation of the shaft which takes place about the rotational axis and from the intermediate position of the second locking element. In other words, on its path from the released position into the locked position, for example when the actuating device is actuated, the second locking element is deflected by means of the deflector face while the shaft is rotating relative to the housing about the rotational axis at a rotational speed which is different than zero, that is to say said second locking element is impeded from reaching the locked position, with the result that the second locking element passes merely into the intermediate position which lies between the released position and the locked position, or reaches merely the intermediate position. Since the shaft is rotating about the rotational axis, contact of the deflector face with the correspondingly other locking element takes place in the intermediate position of the second locking element and before the second locking element reaches the locked position, with the result that, for example, the other locking element slides on the deflector face, as a result of which the second locking element is moved out of the intermediate position back into the released position although the actuating device is situated in its actuated state. As a result, it can be avoided that the second locking element comes into engagement with the first locking element if the shaft is rotating relative to the housing about the rotational axis at an excessive rotational speed. As a result, for example during riding of the motorcycle, locking of the shaft which is sudden and, in particular, undesired or results from improper use can be avoided, with the result that particularly safe operation of the motorcycle can be ensured. In other words, any actuation of the actuating device which takes place during riding of the motorcycle does not lead to locking of the shaft, as a result of which excessive loads of the transmission and resulting damage can be avoided during riding.

In one particularly advantageous refinement of the invention, the actuating device has at least one actuating element which can be moved, in particular in a translational manner, relative to the housing out of a starting position into an actuating position, in particular along an actuating device. Here, the actuating direction runs parallel to the movement direction or coincides with the movement direction. The actuating element can be moved relative to the housing out of the starting position into the actuating position, in order to move the actuating device into its actuated state as a result. In other words, for example, the movement of the movement element out of the starting position into the actuating position results from the actuation of the actuating device, from which movement the actuated state of the actuating device results. As a result, a particularly advantageous, simple and robust actuation of the actuating device and therefore of the locking device can be ensured.

It has been shown to be particularly advantageous here if the safety device has a spring element, via which the second locking element is supported on the actuating element along the movement direction. Here, the spring element permits, with stressing of the spring element, the (in particular, translational) movement of the second locking element into the released position, which movement is brought about by way of the deflector face and takes place relative to the actuating element and along the movement direction and preferably along the actuating direction. In other words, if the movement direction is actuated while the shaft is rotating relative to the housing about the rotational axis at an excessive rotational speed, although the actuating element is moved as a result out of the starting position into the actuating position, as a result of which, for example, the second locking element is moved by means of the actuating element out of the starting position in the direction of the locking position, since the shaft is rotating relative to the housing about the rotational axis, the locking element does not reach the locked position, but rather the second locking element reaches merely the intermediate position, starting from which the second locking element is moved back into the released position by means of the deflector face. This is possible while the actuating element is situated in the actuating position, since the spring element is stressed. In the case of the (in particular, translational) movement of the second locking element along the movement direction out of the intermediate position into the released position, the second locking element is moved toward the actuating element, for example, along the movement direction and, in particular, along the actuating direction. This is permitted by the spring element, since the spring element can be deformed elastically, the spring element being stressed. As a consequence, the spring element provides a spring force which acts, for example, on the second locking element.

If, for example, the shaft then comes to a standstill, in particular in such a way that the locking elements overlap or cover one another, with the result that the locking elements can engage into one another, the initially stressed spring element can be relieved, for example, at least partially, with the result that, in particular while the actuating element is situated in the actuating position, the second locking element can be moved or is moved out of the released position into the locked position by means of the spring force which is provided by the spring element.

If, however, the actuating element is moved, for example, out of the actuating position into the starting position before the shaft reaches a standstill or before the locking elements can engage into one another, the spring element is relieved as a result, for example, with the result that the second locking element is then not moved into the locking position by means of the spring element.

A further embodiment is distinguished by the fact that a restoring device is provided, by means of which the actuating element can be moved out of the actuating position into the starting position. If, for example, an actuation of the actuating device ends or the actuated state of the actuating device ends, the actuating element is moved out of the actuating position into the starting position by means of the restoring device, with the result that, for example, a movement of the locking element out of the released position into the locked position does not then take place, which movement is brought about by way of the actuating element. As a result, a particularly advantageous actuation can be ensured.

It has been shown to be particularly advantageous here if the restoring device has at least one spring device, via which the actuating element is supported on the housing. The spring device is stressed at least in the actuating position and, as a result, provides a spring force, by means of which the actuating element can be moved out of the actuating position into the released position. Said embodiment is advantageous, in particular, when, for example, an actuator which is configured for moving the actuating element between the starting position and the actuating position and, for example, can be operated electrically fails, with the result that the actuator can no longer move the actuating element, for example, out of the actuating position into the starting position. A movement of this type of the actuating element out of the actuating position into the starting position can then be brought about by way of the spring device. It is therefore possible, for example, for the actuating element to be moved into the starting position and, in particular, to be held in the starting position even when, for example, a power failure occurs, with the result that the actuator can no longer be operated.

In order for a particularly advantageous actuation of the locking device to be realized, it is provided in a further refinement of the invention that the restoring device comprises at least one magnet, by means of which magnetic forces can be provided, by means of which the actuating element can be moved out of the actuating position into the starting position and can preferably be held in the starting position. The magnet is preferably configured as a permanent magnet, with the result that the actuating element can be moved in a safe and defined manner out of the actuating position into the starting position and, in particular, can be held in the starting position, even in the case of a power failure. If the actuating element is situated in the starting position, a movement of the second locking element out of the released position into the locked position or in the direction of the locked position does not take place, which movement is brought about by way of the actuating element.

In order for a particularly safe and defined actuation of the locking device to be realized, it is provided in a further refinement of the invention that the actuating element is coupled to the second locking element in such a way that, in the case of its movement out of the actuating position into the starting position, the actuating element drives the second locking element and, as a result, moves it into the released position. To this end, the actuating element is preferably coupled to the second locking element in a positively locking manner. If, for example, the second locking element is therefore situated in its locked position whereas the actuating element is situated in its actuating position, and if the actuating element is then moved out of the actuating position into the starting position, for example, in particular by means of the abovementioned actuator, in particular in a translational manner along the actuating direction, the actuating element drives the second locking element, as a result of which the second locking element is moved out of the locked position into the released position.

A further embodiment is distinguished by the fact that the actuating device comprises an actuating housing and an actuator which is arranged in the actuating housing, can be driven electrically, and can be configured, for example, as the abovementioned actuator. The movement of the actuating element relative to the actuating housing out of the starting position into the actuating position can be brought about by means of the actuator, in particular in a translational manner and along the actuating direction, in particular with the aid of electric current. In other words, for example, the actuator is supplied with electric current or with electric energy, with the result that the actuating element is moved or can be moved at least out of the starting position into the actuating position by means of the actuator. The actuating element and the second locking element which can be moved relative to the actuating housing are held on the housing of the transmission at least via the actuating housing. The actuating element can be moved, in particular, along the actuating direction and in a translational manner relative to the actuating housing, it being possible, for example, for the second locking element to be moved along the movement direction and preferably in a translational manner relative to the actuating housing.

Here, in the actuated state of the actuating device, the safety device permits the movement of the second locking element into the released position, which movement is brought about by way of the deflector face, by the safety device permitting a movement of the actuating housing, which movement runs along the movement direction and takes place relative to the housing of the transmission, and permitting the movement of the actuator, the actuating element and the second locking element with said actuating housing. If, for example, the deflector face comes into contact with the respective other locking element while the second locking element is situated in the intermediate position, the second locking element and, via it, the actuating element, the actuator and the actuating housing are moved away, in particular are pressed away, from the first locking element, for example, and are moved here along the movement direction relative to the transmission housing, in particular in a translational manner, with the result that, despite the actuated state of the actuating device, the locking element can pass or is moved out of the intermediate position into the released position.

Here, the actuated state of the actuating device is to be understood to mean, in particular, the following: by way of movement of the actuating element out of the starting position into the actuating position, the actuating element is first of all moved relative to the actuating housing, in particular in a translational manner and/or along the actuating direction, and therefore passes first of all into an actuating location, for example, relative to the actuating housing and into the actuating position relative to the transmission housing. This means that the actuating element assumes, for example, the actuating position relative to the transmission housing and the actuating location relative to the actuating housing, the actuating location first of all coinciding with the actuating position, for example. If the actuating element and, with it, the actuator and the actuating housing are then moved via the second locking element in the described way by means of the deflector face, with the result that the second locking element passes into its released position, the actuating element changes its position or location relative to the transmission housing, with the result that, for example, the actuating element leaves the actuating position relative to the transmission housing, but, for example, the actuating element maintains its actuating location relative to the actuating housing, since the second locking element, the actuating element and the actuating housing and the actuator are moved together by means of the deflector face along the movement direction, in particular in a translational manner, relative to the transmission housing, with the result that the second locking element passes into its released position in relation to the transmission housing.

Therefore, for example, the actuating element is moved relative to the transmission housing, in particular along the movement direction or along the actuating direction, but a movement of the actuating element relative to the actuating housing does not take place, for example, with the result that the actuating element leaves its actuating position, for example, but maintains its actuating location. In this way, particularly safe operation of the motorcycle can be realized in a particularly simple way. In particular, the safety device makes it possible to avoid locking of the shaft in the case of, for example, unintended or improper actuation of the actuating device.

In order for it to be possible for a particularly advantageous actuation of the locking device to be realized in a particularly inexpensive way, it is provided in a further refinement of the invention that the actuating device is configured as a module which can be preassembled independently of the remaining transmission and, in the preassembled state, can be mounted or is mounted on the housing of the transmission.

A second aspect of the invention relates to a motorcycle with at least one drive motor which is configured, for example, as an internal combustion engine or else as an electric machine. Furthermore, the motorcycle comprises a transmission which can be driven by the drive motor, in particular a transmission according to the invention in accordance with the first aspect of the invention.

The drive motor has, for example, an output shaft which is configured, in particular, as a crankshaft and via which the drive motor can provide torques for driving the motorcycle. The respective drive torque can be introduced into the transmission, as a result of which the transmission is driven. The transmission comprises a housing which is also called a transmission housing, and at least one shaft which can be rotated relative to the housing about a rotational axis and is received in the housing at least partially, in particular at least predominantly or completely. Moreover, the transmission comprises a locking device which has at least one first locking element which can co-rotate with the shaft and at least one second locking element. The second locking element can be moved along a movement direction relative to the housing, relative to the shaft and relative to the first locking element between at least one released position and at least one locked position, in particular in a translational manner. In the locked position, the locking elements engage into one another, as a result of which the locking elements interact in a positively locking manner and secure the shaft against rotation relative to the housing. In the released position, an engagement of the locking elements into one another does not take place, with the result that, in the released position, the locking elements release the shaft for a rotation relative to the housing about the rotational axis.

Furthermore, an actuating device is provided, by means of which, with actuation of the actuating device, the second locking element can be moved out of the released position into the locked position via at least one intermediate position which lies between the released position and the locked position. The actuating device is to be actuated manually, for example, by a person, with the result that, for example, the person can bring about the movement of the second locking element out of the released position via the intermediate position into the locked position, by the person actuating the actuating device manually.

In order for it then to be possible for a particularly advantageous actuation of the locking device and particularly safe operation of the motorcycle to be realized, it is provided in the case of the second aspect of the invention that the motorcycle, in particular the transmission, has a safety device. In the actuated state of the actuating device, the safety device permits a movement of the second locking element out of the intermediate position which results from the actuated state of the actuating device into the released position, and comprises at least one deflector face which is provided on at least one of the locking elements, runs obliquely with respect to the movement direction, and by which, in the actuated state of the actuating device, the second locking element can be moved out of the intermediate position into the released position as a consequence of a contact of the deflector face which is provided on the at least one locking element with the respective other locking element, which contact results from a rotation of the shaft which takes place about the rotational axis and from the intermediate position of the second locking element. Advantages and advantageous refinements of the first aspect of the invention are to be considered to be advantages and advantageous refinements of the second aspect of the invention, and vice versa.

Further details of the invention result from the following description of preferred exemplary embodiments with the associated drawings.

BRIEF DESCRIPTION OF THE DRAWINGS

In the figures, identical or functionally identical elements are provided with identical designations.

DETAILED DESCRIPTION OF THE DRAWINGS

Figure 1:
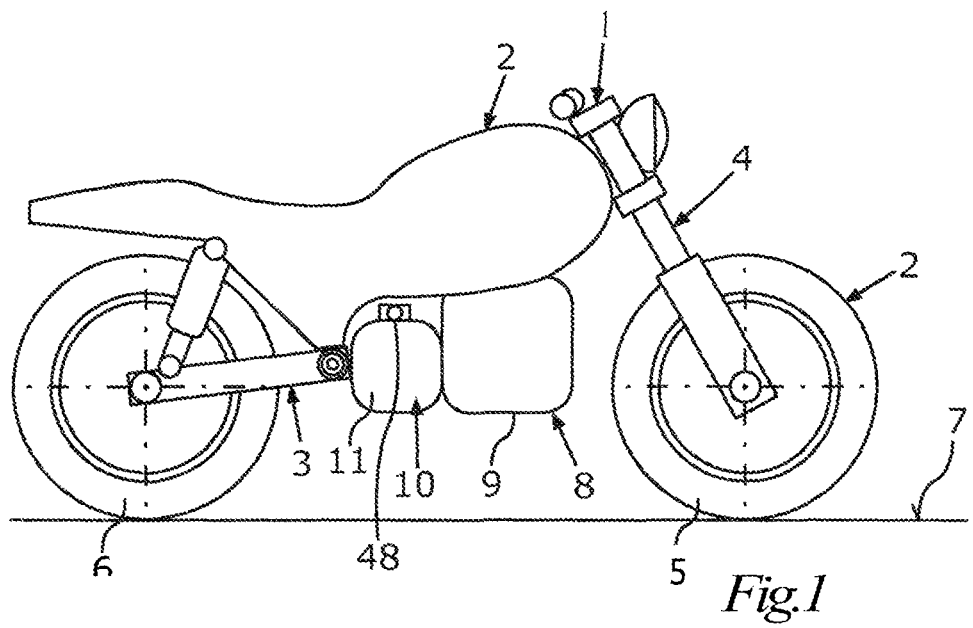
FIG. 1 shows a diagrammatic side view of a motorcycle according to the invention.

FIG. 1 shows a diagrammatic side view of a motorcycle which is denoted overall by 1, is a motor vehicle with precisely one track, and is also called a motorbike. The motorcycle 1 comprises a frame 2 and a swing arm 3 which is held pivotably on the frame 2. The swing arm 3 is supported on the frame 2, for example, in a sprung and damped manner. Furthermore, the motorcycle 1 has a fork 4 which is configured as a damping fork and is held pivotably on the frame 2. The fork 4 can be pivoted relative to the frame 2, for example, about a pivot axis which is also denoted as a steering axis, in particular by the rider of the motorcycle 1. Furthermore, the motorcycle 1 comprises wheels 5 and 6 which are arranged behind one another or so as to follow one another in the longitudinal direction of the motorcycle 1 and are assigned to the same track. The wheel 5 is a front wheel which is held rotatably on the fork 4. If the fork 4 and, with the fork 4, the wheel 5 are pivoted about the steering axis relative to the frame 2, directional changes or driving around bends of the motorcycle 1 are brought about as a result, for example.

The wheel 6 is a rear wheel which is held rotatably on the swing arm 3. The wheels 5 and 6 are ground contact elements, via which the motorcycle 1 is supported or can be supported on a roadway 7 downward in the vertical direction. If the wheels 5 and 6 can rotate relative to the frame 2 about respective wheel rotational axes and if, during this, the motorcycle 1 is pushed or moved along the roadway 7, while the wheels 5 and 6 make contact with the roadway 7, the wheels 5 and 6 roll on the roadway 7.

Furthermore, the motorcycle 1 comprises a drive train 8 which is held on the frame 2 or is connected to the frame 2. The drive train 8 comprises a drive motor 9 which is configured, for example, as an electric machine or else as an internal combustion engine. The drive motor 9 has, for example, an output shaft which is configured, in particular, as a crankshaft and via which the drive motor 9 can provide respective drive torques (also called drive moments) for driving the motorcycle 1. Furthermore, the drive train 8 has a transmission 10, it being possible for the wheel 9 to be driven via the transmission 10 by the output shaft and therefore by the drive motor 9. This means that the respective torque which is provided by the drive motor 9 via the output shaft can be transmitted via the transmission 10 to the wheel 6, as a result of which the wheel 6 and therefore the motorcycle 1 overall can be driven.

Figure 2:
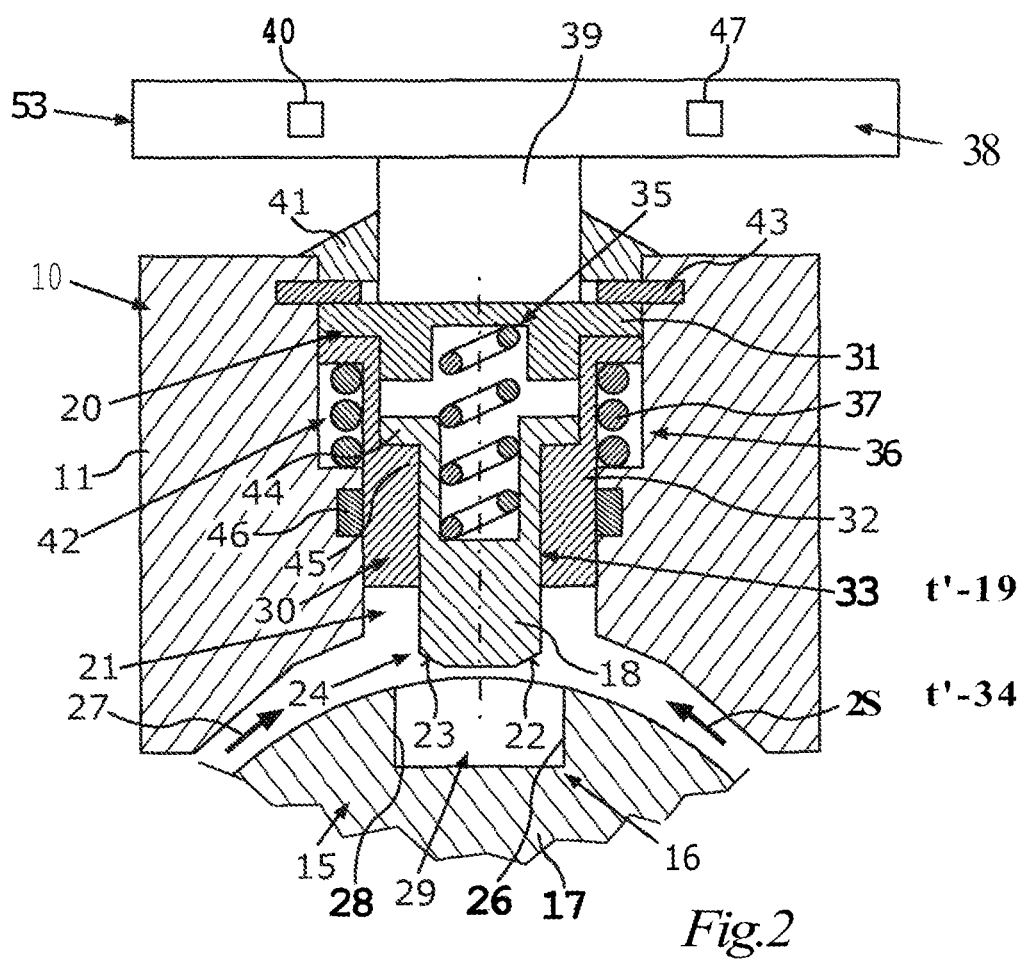
FIG. 2 shows details of a diagrammatic and sectioned front view of a transmission according to the invention in accordance with a first embodiment.

FIG. 2 shows details of a diagrammatic and sectioned front view of the transmission 10. It can be seen from FIG. 2 that the transmission 10 has a housing 11 which is also called a transmission housing. It can be seen in combination with FIG. 4 that the transmission housing delimits a receiving space 12. The transmission housing has, for example, a plurality of housing parts which are configured separately from one another and are connected to one another.

Furthermore, the transmission 10 has at least one shaft 13 which is received partially, in particular at least predominantly or completely, in the receiving space 12 and therefore in the housing 11 and can be rotated relative to the housing 11 about a rotational axis 14. The shaft 13 is, for example, a transmission output shaft of the transmission 10. The shaft 13 is, for example, coupled to the wheel 6, in particular permanently, with the result that, for example, the shaft 13 is always rotated relative to the housing 11 about the rotational axis 14 when the shaft 13 can rotate relative to the housing 11 about the rotational axis 14 and the wheel 6 is rotated about its wheel rotational axis relative to the swing arm 3 and relative to the frame 2. If, as will be described in greater detail in the following text, the shaft 13 is secured, however, against a rotation relative to the housing 11 about the rotational axis 14, the wheel 6 also cannot be rotated about its wheel rotational axis relative to the frame 2, as a result of which the motorcycle 1 can be secured against overly easy and undesired rolling away or movement along the roadway 7. As a result, an advantageous anti-theft protection means can be realized.

It can be seen particularly clearly from FIG. 2 that the transmission 10 and therefore the motorcycle 1 has a locking device 15 which comprises at least one first locking element 16 which can corotate with the shaft 13. The first locking element 16 is formed, for example, by way of a locking gear 17 which is a component which is configured separately from the shaft 13 and is connected fixedly to the shaft 13 to as to rotate with it. The locking gear 17 is provided, for example, in addition to gearwheels of respective shiftable gears of the transmission 10, and is arranged here on the shaft 13. Furthermore, the locking device 15 comprises a second locking element 18 which can be moved between at least one released position (shown in FIG. 2) and at least one locked position (not shown in the figures) relative to the housing 11, relative to the shaft 13 and relative to the first locking element 16 along a movement direction which is illustrated by way of a double arrow 19 in FIG. 2 and runs, for example, in the radial direction of the shaft 13.

Figure 4:
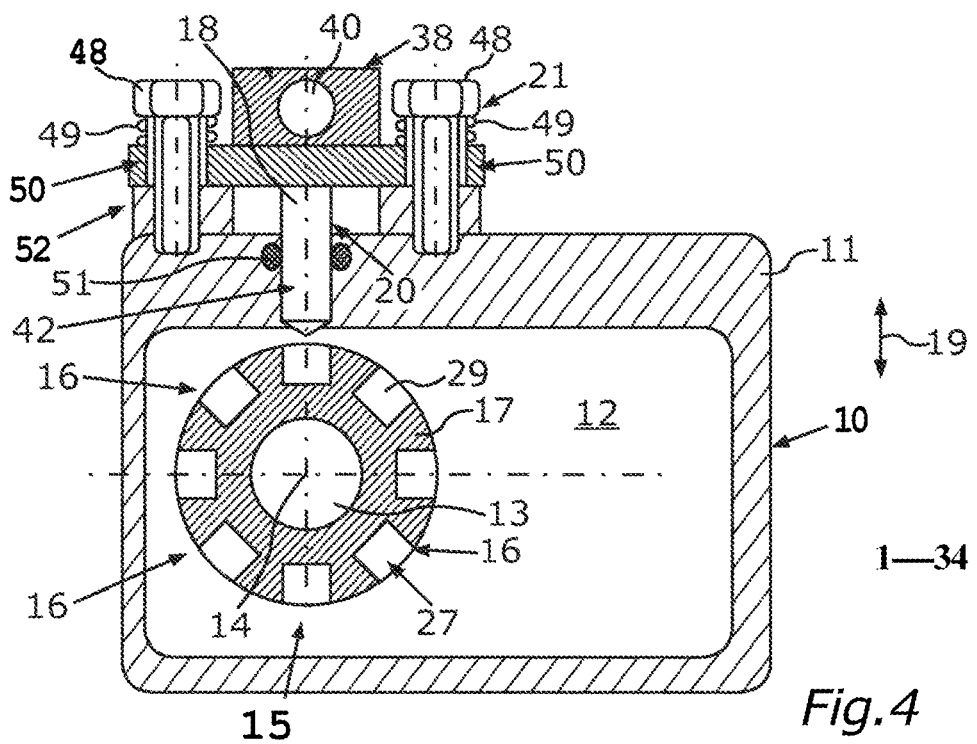
FIG. 4 shows a diagrammatic and sectioned front view of the transmission in accordance with a third embodiment.

It can be seen from FIG. 4 that the locking device 15 has a plurality of first locking elements 16 which are formed, in particular, by way of the locking gear 17 and are arranged spaced apart from one another and so as to follow one another, for example, in the circumferential direction of the shaft 13 or the locking gear 17.

In the locked position of the locking element 18, the locking element 18 engages into one of the locking elements 16, as a result of which the locking elements 16 and 18 engage into one another and therefore interact in a positively locking manner. Here, the locking element 18 is held on the housing 11 at least indirectly in such a way that the locking element 18 is secured against a rotation about the rotational axis 14 relative to the housing 11. Therefore, in the locked position, the shaft 13 is secured by means of the locking elements 16 and 18 against a rotation relative to the housing 11 about the rotational axis 14. In the released position, however, an engagement of the locking elements 16 and 18 into one another does not take place. In other words, in the released position, the locking element 18 does not engage into any of the locking elements 16, as a result of which the shaft 13 is released for a rotation relative to the housing 11 about the rotational axis 14.

Moreover, the transmission 10 and therefore the motorcycle 1 comprise an actuating device 20, by means of which, with actuation of the actuating device 20, the second locking element 18 can be moved along the movement direction relative to the housing 11 out of the released position via at least one intermediate position which lies between the released position and the locked position.

In order for it then to be possible for a particularly advantageous actuation of the locking device 15 and particularly safe operation of the motorcycle 1 to be realized, a safety device 21 is provided which, in the actuated state of the actuating device 20 or despite the actuated state of the actuating device 20, permits a movement of the second locking element 18 out of the intermediate position which results from the actuated state of the actuating device 20 into the released position, and has deflector faces 22 and 23 which are provided on the locking element 18 and are formed by way of a beveled end 24 of the actuating element 30. The deflector faces 22 and 23 run obliquely with respect to the actuating direction, and are arranged on opposed or opposite sides of the locking element 18 in the circumferential direction of the shaft 13 or the locking gear 17 or, in the case of a cylindrical locking element 18, are configured as a chamfer.

In the actuated state of the actuating device 20, the second locking element 18 can be moved out of the intermediate position into the released position as a consequence of a contact of the deflector face 22 or 23 which is provided on the locking element 18 with the other locking element 16, which contact results from a rotation of the shaft 13 which takes place about the rotational axis 14 and from the intermediate position of the second locking element 18.

If, for example, the actuating device 20 is actuated manually by a person while the shaft 13 and, with it, the locking gear 17 and therefore the locking elements 16 are rotating relative to the housing 11 about the rotational axis 14 at an excessive rotational speed, this results in a movement of the locking element 18 out of the released position in the direction of the locked position. The safety device 21 prevents, however, that the locking element 18 reaches the locked position, since, for example, when the shaft 13 is rotated about the rotational axis 14 relative to the housing 11 in a first rotational direction which is illustrated by way of an arrow 25 in FIG. 2, the deflector face 22, for example, comes into contact with the locking element 16, in particular with a wall region 26 of the locking element 16. In particular, the locking element 18 comes into contact via the deflector face 22 with the wall region 26 before the locking element 18 reaches the locked position, with the result that said contact between the deflector face 22 and the wall region 26 prevents the locking element 18 from reaching the locked position. As a consequence, the wall region 26 can slide on the deflector face 22. Since the deflector face 22 runs obliquely with respect to the movement direction here, a force which runs along the movement direction and points away from the locking element 16 here results from the contact of the deflector face 22 with the wall region 26. By means of said force, the locking element 18 is moved out of the intermediate position, in which the locking element 18 engages, for example, into the locking element 16, back into the released position.

If, for example, the shaft 13 is rotating about the rotational axis 14 relative to the housing 11 at an excessive rotational speed in a second rotational direction which is opposed to the first rotational direction and is illustrated by way of an arrow 27 in FIG. 2 while the actuating device 20 is actuated, the deflector face 23 then comes into contact with the locking element 16, in particular with a wall region 28 of the locking element 16. Said contact prevents the locking element 18 from reaching the locked position. The wall region 28 can slide on the deflector face 23. Since the deflector face 23 runs obliquely with respect to the movement direction, a force which runs along the movement direction, points away from the locking element 16, and by means of which the locking element 18 is moved out of the intermediate position back into the released position results from the contact between the deflector face 23 and the wall region 28.

It can be seen particularly clearly from FIG. 2 that the respective locking element 16 has a recess 29, into which the locking element 18 engages in the locked position. Here, the recess 29 is delimited at least partially, in particular at least predominantly or completely, by way of the wall region 26 in the second rotational direction, the recess 29 being delimited at least partially, in particular at least predominantly or completely, by way of the wall region 28 in the second rotational direction.

If, for example, the shaft 13 or the locking gear 17 is situated in a state which is such that one of the locking elements 16, in particular the recess 29 of one of the locking elements 16, is situated in an overlap or congruence with the locking element 18, and if the actuating device 20 is then actuated, the locking element 18 can dip or engage into the respective locking element 16, or into the recess 29 of the locking element 16, with which the locking element 18 is situated in an overlap or congruence, with the result that the locking element 18 can reach the locked position. The respective recess 29 is also called a pocket which is formed by way of the locking gear 17.

If, however, the shaft 13 is rotated relative to the housing 11 about the rotational axis 14, it is prevented in the described way by means of the respective deflector face 22 or 23 and by means of the respective wall region 26 or 28 that the locking element 18 passes into the locked position, but rather the locking element 18 is deflected and is moved in the described way out of the intermediate position back into the released position. The locking element 18 is therefore prevented from passing into the locked position, with the result that the locking element 18 passes merely into the intermediate position, in which securing of the shaft 13 about the rotational axis 14 relative to the housing 11 does not take place, which securing is brought about by way of the locking elements 16 and 18.

A rotation of the shaft 13 and therefore of the respective locking element 16 in the first rotational direction takes place, for example, when the motorcycle 1 is ridden or pushed forward along the roadway 7. A rotation of the shaft 13 and therefore of the locking elements 16 in the second rotational direction results, for example, when the motorcycle 1 is pushed backward along the roadway 7. It can be seen overall that it is avoided by way of the safety device 21 that, for example when the actuating device 20 is actuated unintentionally or improperly during riding of the motorcycle 1, locking of the shaft 13 occurs, as a result of which excessive loads of the transmission 10 and damage of the transmission 10 can be avoided reliably.

The actuating device 20 comprises at least one actuating element 30 which has, for example, a first actuating part 31 and a second actuating part 32. The actuating part 32 is, for example, a bolt outer part, the locking element 18 being, for example, a bolt inner part. Here, the locking element 18 is received at least partially in the actuating part 32. Here, the actuating part 32 has a through opening 33 which is penetrated by the locking element 18. The actuating part 31 is, for example, a bolt cap, the actuating part 31 being connected to the actuating part 32. Here, the actuating element 30 can be moved in a translational manner relative to the housing 11 along an actuating direction which is illustrated by way of a double arrow 34 in FIG. 2 and coincides with the movement direction and can be moved along the actuating direction and in a translational manner relative to the locking element 18 and relative to the housing 11 between at least one starting position which is shown in FIG. 2 and at least one actuating position.

In particular, the actuating element 30 can be moved out of the starting position into the actuating position by way of actuation of the actuating device 20. This means, for example, that the actuating device is situated in its actuated state when the actuating element 30 is situated in the actuating position relative to the housing 11 and, for example, in an actuating location relative to an actuating housing 53 of the actuating device 20. Here, the safety device 21 has a spring element 35, via which the locking element 18 is supported along the movement direction or along the actuating direction on the actuating element 30, in particular on the actuating part 31. Here, the spring element 35 is configured, for example, as a helical spring. If, for example, the actuating element 30 is moved out of the starting position into the actuating position, the actuating element 30 exerts, for example, a force which acts, in particular, in the direction of the locking gear 17 via the spring element 35.

If the locking element 18 is situated in congruence with the recess 29 of one of the locking elements 16, the locking element 18 is moved into the recess 29 by means of the force. If, however, reaching of the locking position is prevented by way of the actuating element 30 in the described way and therefore by way of the fact that the locking element 18 comes into contact and therefore into supporting contact with the respective locking element 16 via one of the deflector faces 22 and 23, the actuating element 30 is moved relative to the locking element 18, for example, by way of its actuation along the actuating direction or movement direction, as a result of which the spring element 35 is stressed, for example. Put differently, the spring element 35 permits the above-described movement of the locking element 18 out of the intermediate position into the released position by virtue of the fact that the spring element 35 can be deformed elastically, although the actuating element 30 is situated in the actuating position.

In other words, if the actuating element 30 is situated in the actuating position, and if the locking element 18 cannot reach its locked position, since it is deflected by way of the respective deflector face 22 or 23 and is therefore prevented from reaching the locked position, the spring element 35 is stressed and in the present case is compressed if the locking element 18 is locked from moving out of the intermediate position into the released position in the described way and therefore by means of the respective deflector face 22 or 23, with the result that, in particular when the actuating element 30 is situated in the actuating position and the locking element 18 is situated in the intermediate position or in the released position, the spring element 35 is stressed, with the result that the spring element 35 provides a spring force. If, for example, the shaft 13 and therefore the locking gear 17 then come to a standstill of this type and in the process into a rotational position such that the locking element 18 is covered or overlapped toward the inside in the radial direction of the shaft 13 and therefore of the locking gear 17 by way of the recess 29 of one of the locking elements 16, the spring element 35 can be relieved at least partially, as a result of which the locking element 18 is moved out of the released position via the intermediate position into the locked position by means of the spring force which is provided by the spring element 35. It can be seen overall that the spring element 35 and the stressing of the spring element 35 permits the movement of the second locking element 18 out of the intermediate position into the released position, which movement is brought about by way of the respective deflector face 22 or 23 and takes place relative to the actuating element 30 and along the movement direction.

Furthermore, a restoring device 36 is provided, by means of which the actuating element 30 can be moved out of the actuating position into the starting position. FIG. 2 shows a first embodiment of the transmission 10. In the case of the first embodiment, the restoring device 36 comprises a spring element 37 which is supported along the actuating direction on the housing 11 and on the actuating element 30, in particular on the actuating part 32. The spring element 37 is a spring device which is stressed by way of movement of the actuating element 30 out of the starting position into the actuating position and is therefore stressed in the actuating position of the actuating element 30. As a result, the spring element 37 provides a spring force in the actuating position, by means of which spring force the actuating element 30 can be moved or is moved out of the actuating position into the released position, in particular when an actuation of the actuating device 20 ends and therefore the actuating element 30 is no longer held in the actuating position counter to the spring force which is provided by way of the spring element 37.

The actuating device 20 comprises, for example, a module part 38 which has the actuating housing 53, a movement element 39 which is configured, for example, as a bolt, for example as a locking bolt, and, for example, an actuator 40 which is shown particularly diagrammatically in FIG. 2, is received in the actuating housing 53, and can be driven electrically. By means of the actuator 40, for example, the movement element 39 can be moved to and fro in a translational manner along the actuating direction or along the movement direction, in particular relative to the actuating housing 53 and relative to the housing 11. In particular, the movement element 39 can be moved by means of he actuator 40 along the movement direction between a first position and a second position, in particular in a translational manner and relative to the actuating housing 53. The movement element 39 is coupled, for example, to the actuating element 30, with the result that movements of the movement element 30 between the first position and the second position accompany movements of the actuating element 30 between the actuating position and the starting position. For example, the first position of the movement element 39 corresponds with the starting position of the actuating element 30, the second position of the movement element 39 corresponding, for example, with the actuating position of the actuating element 30.

In order, for example, to move the actuating element 30 out of the starting position into the actuating position, the movement element 39 is moved out of the first position into the second position by means of the actuator 40. In order, for example, to move the actuating element 30 out of the actuating position into the starting position, the movement element 39 is moved out of the second position into the first position, for example, by means of the actuator 40. Therefore, for example, the actuator 40 exerts pressing forces via the movement element 39 on the actuating element 30, in order to move the latter out of the starting position into the actuating position. For example, the actuator 40 exerts pulling forces via the movement element 39 on the actuating element 30, in order to move the latter out of the actuating position into the starting position. If no coupling is provided which can transmit pulling forces, the restoring device 36 then serves, in particular, to move the actuating element 30 and therefore the locking element 18 out of the actuating position and out of the locked position, respectively, into the starting position and into the released position, respectively.

The module part 38 is fastened, in particular directly, to the housing 11 or to the frame 2, for example via the actuating housing 53, with the result that the module part 38 is a module which can be preassembled or is preassembled independently of the remaining actuating device 20, in particular of the remaining transmission 10, which module is mounted or can be mounted in the preassembled state on the remaining actuating device 20, in particular on the remaining transmission 10. The actuating element 30 can therefore be moved along the actuating direction relative to the actuating housing 53. If the movement element 39 is moved by means of the actuator 40 out of the first position into the second position, the actuating element 30 is moved into the abovementioned actuating position in relation to the actuating housing 53. Furthermore, the actuating element 30 is moved into the actuating position relative to the housing 11, as a result of which the spring element 37 is stressed.

It can be seen overall that, for example, the locking element 18 is a sprung bolt, in particular a sprung bolt inner part which has the deflector faces 22 and 23 as end-side bevels. As a result, undesired locking of the shaft 13 during riding of the motorcycle 1 can be avoided. The movement element 39 is sealed against the housing 11, for example, by means of a seal 41. The actuating element 30 and the locking element 18 are received in the housing 11 in an opening 42 which is configured, for example, as a through opening, and are secured against falling out of the opening 42 in a first direction by means of a securing ring 43. In a second direction which is opposed to the first direction, the locking element 18 and the actuating element 30 are secured on the housing 11 via the actuating element 30 and, in particular, via the spring element 37.

Moreover, the locking element 18 is coupled in a positively locking manner to the actuating element 30 in such a way that the actuating element 30, in the case of its movement out of the actuating position into the starting position, drives the second locking element 18 and moves it into the released position as a result. To this end, the locking element 18 has a collar 44, via which the locking element 18 is supported along the movement direction on a corresponding stop 45 of the actuating element 30, in particular of the actuating part 32. In particular, the locking element 18 is supported on the stop 45 via the collar 44 toward the respective first locking element 16. Moreover, a seal 46 is provided, by means of which the actuating element 30, in particular the actuating part 32, is sealed against the housing 11.

The actuating device 20, in particular the module part 38, has, for example, a receiving unit 47 which is shown particularly diagrammatically in FIG. 2, is arranged, for example, in the actuating housing 53, and is configured, for example, to receive at least one signal in a radio-based manner, which signal is provided by a remote control in a radio-based manner and is, in particular, electromagnetic, and to bring about a movement of the locking element 18 out of the actuating position into the released position in a manner which is dependent on the receiving of the signal. To this end, for example, the receiving unit 47 actuates the actuator 40 in a manner which is dependent on the receiving of the signal, in such a way that the locking element 18 is moved out of the locked position into the released position by means of the actuator 40 via the movement element 39 and the actuating element 30.

In particular, the receiving unit 47 is configured to detect that a spacing between a person, such as a rider of the motorcycle 1, and a component of the motorcycle 1 undershoots a predefined threshold value, in particular that the person is in contact with the component. Furthermore, the receiving unit 47 is configured to bring about the movement of the locking element 18 out of the locked position into the released position in a manner which is dependent on the detection. In other words, if the receiving unit 47 detects that the spacing between the person and said component undershoots the threshold value, and if the receiving unit 47 receives the signal, the receiving unit 47 actuates the actuator 40, with the result that the locking element 18 is moved out of the locked position into the released position by means of the actuator 40 via the movement element 39 and the actuating element 30. The receiving of the signal and the detection that the spacing between the person component undershoots the threshold value are therefore two criteria which should or must at least be fulfilled, with the result that the receiving unit 47 actuates the actuator 40, in order to move the locking element 18 by means of the actuator 40 out of the locked position into the released position. A first one of the criteria is, for example, the receiving of the signal, the first criterion being fulfilled if the receiving unit 47 receives the signal. The second criterion is, for example, the detection that the spacing between the person and the component undershoots the predefined threshold value, the second criterion being fulfilled if the spacing between the person and the component undershoots the threshold value. If, for example, the criteria are fulfilled at least partially at the same time or one after another within a predefined time period, the receiving unit 47 actuates the actuator 40, in order to move the locking element 18 out of the locked position into the released position via the actuating element 30 and the movement element 19 in an electric manner, that is to say with the aid of electric energy or electric current.

The person can therefore bring about a movement of the locking element 18 in a particularly simple and comfortable way, in such a way that the person carries, for example, the remote control, in particular in a pocket of the clothing item of the person, with the result that the receiving unit 47 can receive the signal, and that the person approaches the component, for example, with a hand or a finger of the hand in such a way that the spacing between the person and the component undershoots the threshold value, in particular that the person makes contact with the component. Here, for example, the remote control provides the (in particular, electric or electromagnetic) signal permanently and/or independently of an actuation or operation of the remote control brought about by a person, with the result that the person does not have to actuate the remote control actively, in order for the remote control to provide the signal. The component is, for example, an operating element 54 which can be seen from FIG. 1 and is configured, for example, as an actuating button. The operating element 54 is, for example, a constituent part of the module part 38 and is held here, in particular, at least indirectly on the actuating housing 53.

Overall, it can be seen that the module part 48 is not a fixed constituent part of the transmission 10 per se, with the result that without the module part 38, for example, the transmission 10 can form a unit which is self-contained and can be tested. Furthermore, an arrangement of the module part 38 which is particularly favorable in terms of installation space and is visually appealing can be realized by virtue of the fact that the module part 38 is held, for example, on the housing 11 or on the frame 2, in particular directly, it not necessarily being required for the module part 38 to be arranged on the fork 4, in particular on a fork crown, where devices are usually attached to counter unauthorized use.

Figure 3:
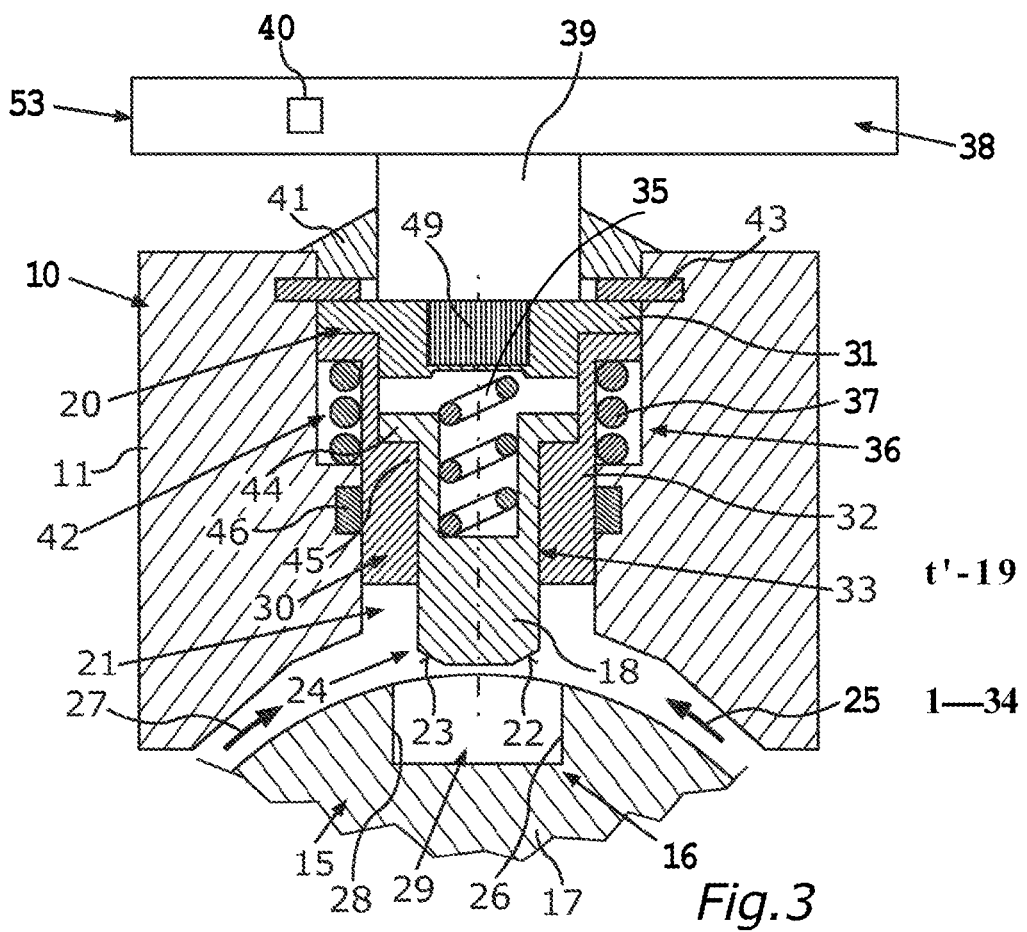
FIG. 3 shows details of a diagrammatic and sectioned front view of the transmission in accordance with a second embodiment.

FIG. 3 shows a second embodiment of the transmission 10 and therefore of the motorcycle 1. The second embodiment differs from the first embodiment, in particular, by virtue of the fact that, instead of the spring element 37, a magnet 49 is provided which is configured, in particular, as a permanent magnet. The magnet 49 provides magnetic forces, for example, by means of which the actuating element 30 and, via the latter, the locking element 18 can be restored. This is to be understood to mean that the actuating element 30 can be moved out of the actuating position into the starting position by means of the magnetic forces which are provided by the magnets 49, as a result of which the locking element 18 can be moved out of the locked position into the released position.

Finally, FIG. 4 shows a third embodiment of the transmission 10. In the case of the third embodiment, the locking element 18 can be moved to and fro between the released position and the locked position relative to the housing 11 along the movement direction by means of the actuator 40, in particular directly or via an actuating element which cannot be seen in greater detail in FIG. 4. The locking element 18 is coupled to the actuator 40, for example, via the actuating element 30 which cannot be seen in FIG. 4, or via another actuating element 30. Therefore, for example, the locking element 18 which can be moved in a translational manner along the movement direction relative to the actuating housing 53 is coupled to the actuating housing 53 via the actuating element and the actuator 40, the actuating element and the locking element 18, for example, being held on the housing 11 of the transmission 10 at least via the actuating housing 53. Here, in the actuated state of the actuating device 20, that is to say, in particular, when the actuating element is situated in the actuating position, the safety device 21 permits the movement of the locking element 18 into the released position, which movement is brought about by way of the respective deflector face 22 or 23, in such a way that the safety device 21 permits a movement of the actuating housing 53 and, with it, of the actuator 40, the actuating element and the second locking element 18, which movement runs along the movement direction and takes place relative to the housing 11.

Here, the module part 38 is held on the housing 11, in particular, via fastening elements 48 which are configured, for example, as screws, and is supported here via spring elements 49 on the fastening elements 48, and is held or can be held on the housing 11 by means of the fastening elements 48 and the spring elements 49. If, however, the locking element 18 is then deflected by means of the respective deflector face 22 or 23, the locking element 18 and, via it, the actuating element, the actuator 40 and the actuating housing 53 are pressed on the respective locking element 16, with the result that the spring elements 49 are compressed and, as a consequence, permit a movement of the locking element 18, the actuating housing 53, the actuating element and the actuator 40 away from the locking element 16. Here, the module part 38 moves away from the housing 11. If the shaft 13 and the locking gear 17 come to a standstill of this type and in the process move into a rotational position which is such that the locking element 18 is overlapped or covered toward the inside in the radial direction of the shaft 13 by way of the recess 29 of one of the locking elements 16, the spring elements 49 can be relieved, as a result of which they move, in particular press, the locking element 18 out of the released position into the locked position via the actuating housing 53, the actuator 40 and the actuating element. Here, the fastening elements 48 penetrate corresponding through openings 50 of the actuating housing 53, the spring elements 49 being supported on one side on the fastening elements 48 and on the other side on a side of the actuating housing 53, which side faces away from the housing 11. Moreover, a seal 51 is provided, by means of which the locking element 18 is sealed against the housing 11.

In the case of the third embodiment, for example, the actuating device 20 comprises the module part 38, the actuating element and the locking element 18, with the result that the actuating device 20 is configured as a module 52 which can be preassembled independently of the remaining transmission 10 and can be mounted in the preassembled state on the remaining transmission 10 or the housing 11 of the transmission 10. Here, for example, the remaining transmission 10 which is different than the module 52 can be configured as a unit which is self-contained and can be tested, in such a way that the opening 42 for the locking element 18 is closed by means of a closure plug. In the case of the third embodiment, the safety device 21 also prevents locking of the shaft 13 during driving of the motorcycle 1 and therefore damage of the transmission 10.

LIST OF DESIGNATIONS

1 Motorcycle
2 Frame
3 Swing arm
4 Fork
5 Wheel
6 Wheel
7 Roadway
8 Drive train
9 Drive motor
10 Transmission
11 Housing
12 Receiving space
13 Shaft
14 Rotational axis
15 Locking device
16 First locking element
17 locking gear
18 Second locking element
19 Double arrow
20 Actuating device
21 Safety device
22 Deflector face
23 Deflector face
24 End
25 Arrow
26 Wall region
27 Arrow
28 Wall region
29 Recess
30 Actuating element
31 Actuating part
32 Actuating part
33 Through opening
34 Double arrow
35 Spring element
36 Restoring device
37 Spring element
38 Module part
39 Movement element
40 Actuator
41 Seal
42 Opening
43 Securing ring
44 Collar
45 Stop
46 Seal
47 Receiving unit
48 Fastening element
49 Spring element
50 Through opening
51 Seal
52 Module
53 Actuating housing
54 Actuating button

What is claimed is:

1. A transmission for a motorcycle, comprising:
a housing;
at least one shaft at least partially within the housing, the at least one shaft being rotatable relative to the housing about a rotational axis;
a locking device having at least one first locking element configured to co-rotate with the shaft and at least one second locking element movable along a movement direction relative to the housing, relative to the shaft and relative to the at least one first locking element between
at least one released position in which the locking elements are not engaged and the shaft is released for a rotation relative to the housing, and
at least one locked position in which the locking elements engage into one another and the shaft is secured against a rotation relative to the housing;
an actuating device configured to move the at least one second locking element out of the released position into the locked position via at least one intermediate position which lies between the released position and the locked position;
a safety device which, when the actuating device is actuated, permits a movement of the at least one second locking element out of the intermediate position to the at least one released position, the safety device including at least one deflector face on at least one of the locking elements and runs obliquely with respect to the movement direction, wherein
when the actuating device is actuated, the at least one second locking element is movable out of the intermediate position into the at least one released position as a result of a contact of the at least one deflector face on the other of at least one locking element due to rotation of the shaft about the rotational axis, and
the actuating device has at least one actuating element configured to be movable relative to the housing out of a starting position into an actuating position; and
a restoring device configured to move the actuating element out of the actuating position into the starting position, wherein
the restoring device includes at least one magnet configured to move the actuating element out of the actuating position into the starting position.

2. The transmission according to claim 1, wherein
the safety device has a spring element which supports the at least one second locking element on the actuating element in the movement direction, and
the spring element is configured to permit movement of the at least one second locking element into the released position when the at least one deflector face generates movement relative to the actuating element along the movement direction.

3. The transmission according to claim 1, wherein
the restoring device has at least one spring device which supports the actuating element on the housing, and the at least one spring device is stressed at least in the actuating position such that the at least one spring device generates a spring force useable to move the actuating element out of the actuating position into the released position.

4. The transmission according to claim 1, wherein
the actuating element is coupled to the at least one second locking element such that the actuating element is able to move the second locking element from the actuating position into the released position.

5. The transmission according to claim 4, wherein
the actuating device includes an actuating housing and an actuator arranged in the actuating housing,
the actuating device is electrically drivable,
the actuating device is configured to move actuating element relative to the actuating housing out of the starting position into the actuating position,
the actuating element and the at least one second locking element which is movable along the movement direction relative to the actuating housing are held on the housing of the transmission at least via the actuating housing, and
when the actuating device is actuated, the safety device is configured to permit the movement of the at least one second locking element into the released position, along the movement direction relative to the housing of the transmission, and to permit the movement of the actuator, the actuating element and the second locking element with the actuating housing.

6. The transmission according to claim 5, wherein
the actuating device is a preassembled module configured to be mounted in a preassembled state on the housing of the transmission.

7. A motorcycle, comprising:
at least one drive motor; and
a transmission configured to be driven by the at least one drive motor, the transmission including
  a housing;
  at least one shaft at least partially within the housing, the at least one shaft being rotatable relative to the housing about a rotational axis;
  a locking device having at least one first locking element configured to co-rotate with the shaft and at least one second locking element movable along a movement direction relative to the housing, relative to the shaft and relative to the at least one first locking element between
    at least one released position in which the locking elements are not engaged and the shaft is released for a rotation relative to the housing, and
    at least one locked position in which the locking elements engage into one another and the shaft is secured against a rotation relative to the housing;
  an actuating device configured to move the at least one second locking element out of the released position into the locked position via at least one intermediate position which lies between the released position and the locked position; and
  a safety device which, when the actuating device is actuated, permits a movement of the at least one second locking element out of the intermediate position to the at least one released position, the safety device including at least one deflector face on at least one of the locking elements and runs obliquely with respect to the movement direction, wherein when the actuating device is actuated, the at least one second locking element is movable out of the intermediate position into the at least one released position as a result of a contact of the at least one deflector face on the other of at least one locking element due to rotation of the shaft about the rotational axis, and
the actuating device has at least one actuating element configured to be movable relative to the housing out of a starting position into an actuating position; and
a restoring device configured to move the actuating element out of the actuating position into the starting position, wherein
the restoring device includes at least one magnet configured to move the actuating element out of the actuating position into the starting position.

8. The motorcycle according to claim 7, wherein
the safety device has a spring element which supports the at least one second locking element on the actuating element in the movement direction, and
the spring element is configured to permit movement of the at least one second locking element into the released position when the at least one deflector face generates movement relative to the actuating element along the movement direction.

9. The motorcycle according to claim 7, wherein
the restoring device has at least one spring device which supports the actuating element on the housing, and
the at least one spring device is stressed at least in the actuating position such that the at least one spring device generates a spring force useable to move the actuating element out of the actuating position into the released position.

10. The motorcycle according to claim 7, wherein
the actuating element is coupled to the at least one second locking element such that the actuating element is able to move the second locking element from the actuating position into the released position.

11. The motorcycle according to claim 10, wherein
the actuating device includes an actuating housing and an actuator arranged in the actuating housing,
the actuating device is electrically drivable,
the actuating device is configured to move actuating element relative to the actuating housing out of the starting position into the actuating position,
the actuating element and the at least one second locking element which is movable along the movement direction relative to the actuating housing are held on the housing of the transmission at least via the actuating housing, and
when the actuating device is actuated, the safety device is configured to permit the movement of the at least one second locking element into the released position, along the movement direction relative to the housing of the transmission, and to permit the movement of the actuator, the actuating element and the second locking element with the actuating housing.

12. The motorcycle according to claim 11, wherein
the actuating device is a preassembled module configured to be mounted in a preassembled state on the housing of the transmission.

* * * * *